United States Patent [19]
Chanton

[11] 4,063,433
[45] Dec. 20, 1977

[54] ELASTIC ROTATIONAL COUPLINGS
[75] Inventor: Edmond Chanton, Clamart, France
[73] Assignee: Societe Generale de Macanique et de Metallurgie, Vanves, France
[21] Appl. No.: 655,040
[22] Filed: Feb. 3, 1976
[30] Foreign Application Priority Data
　　Feb. 5, 1975　France ................................ 75.03592
[51] Int. Cl.² .............................................. F16D 3/17
[52] U.S. Cl. ................................................. 64/11 R
[58] Field of Search ................ 64/11 R, 27 WM, 13, 64/14
[56] References Cited
U.S. PATENT DOCUMENTS
1,772,915　8/1930　Roseberg ............................ 64/11 R 2,079,460　5/1937　Marty .................................. 64/11 R
2,388,450　11/1945　Thompson ......................... 64/11 R
2,542,154　2/1951　McSirow ............................. 64/11 R
2,792,694　5/1957　Merel .................................. 64/11 R
3,124,971　3/1964　Peters et al. ......................... 64/11 R Primary Examiner—Samuel Scott
Assistant Examiner—R. Turner
Attorney, Agent, or Firm—Burgess, Dinklage & Sprung

[57] ABSTRACT

An elastic rotational coupling in which two rotational heads partially embedded in a body of elastic material each comprise a base connected to an end-plate by a neck to define therebetween a groove in which a bead of the elastic material is received. Each end plate has radial notches and an axially outer face which is slightly conical or domed and the groove is shaped to trap said bead therein.

8 Claims, 2 Drawing Figures

U.S. Patent    Dec. 20, 1977    4,063,433
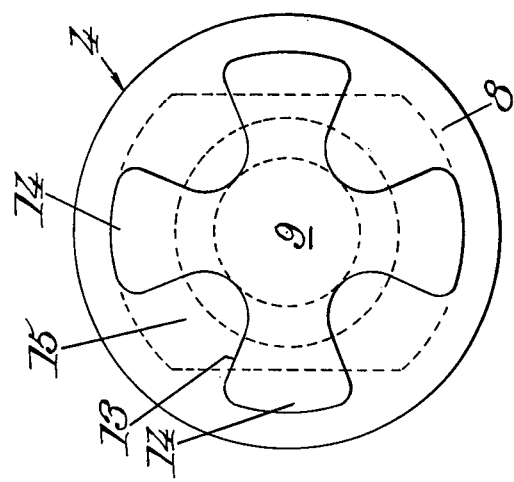
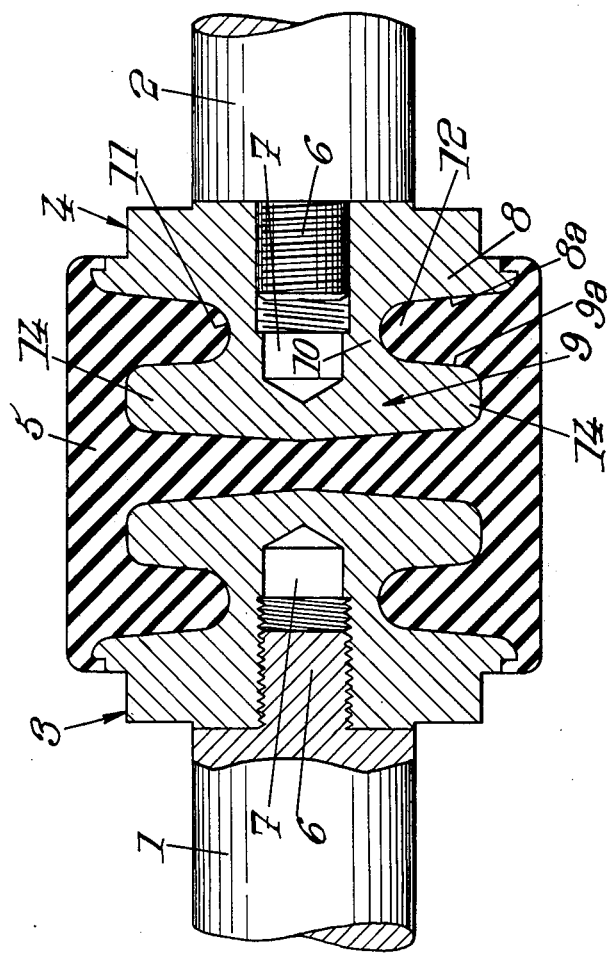

ELASTIC ROTATIONAL COUPLINGS

The invention relates to elastic rotational couplings for transmitting torque between two rotors of which the axes may be slightly inclined to one another, particularly for the purpose of connecting the helical rotor of a screw-type pump to a motor drive shaft.

It is already known to produce such couplings by providing on two shaft ends to be coupled, rigid heads which are in the form of disc-like end-plates between which is located a cylindrical body of an elastic material of substantially the same diameter as the end-plates, the end faces of the heads being bonded to the opposite faces of the elastic body.

Though they meet the requirement that the axes of the two shafts can incline relative to one another, these couplings nevertheless suffer from several major disadvantages.

Firstly, the transmitted torque subjects the body of elastic material to a torsional stress which tends to detach this material from the end-plates, especially near the periphery of the end-plates.

Secondly, if the two shaft ends are liable to move apart axially, the body of elastic material is subjected to tensile stress which also causes detachment of the body of elastic material.

Finally, and more importantly, if the axes of the two shafts are inclined to one another, the diametrically opposite parts of the elastic body located in the plane defined by the two mutually inclined axes are the places where, respectively, a compressive force and a tensile force is applied, so that in use of the coupling a cyclically varying compressive-tensile stress is imposed on each part of the bonded faces of the elastic body and this also causes detachment of the elastic body In another known coupling, in order to attempt to overcome the above disadvantages, the rigid heads fixed to the two shaft ends which are to be coupled are separated from one another by a predetermined distance and are embedded at least partially in a surrounding body of elastic material. Each rigid head has a base connected rigidly to the corresponding shaft end and a disc-plate joined to the said base by a neck, the facing surfaces of the base and of the disc-plate defining, with the neck, an annular groove which is filled with the elastic material. However, in this form of coupling the cross-section of the groove has the general shape of a U broadly open towards the exterior and because of this fact, in order to maintain the elastic material in this groove when axial forces are exerted on the shafts, it is necessary to surround the body of elastic material with a clamping collar. This collar makes the assembly heavier and increases its cost price.

It is an object of the invention to overcome the disadvantages of the coupling devices of the prior art by improving the distribution of the tensile and torsional stresses exerted on the body of elastic material, whilst at the same time requiring a smaller number of component elements.

According to the present invention we provide an elastic rotational coupling for transmitting torque between two rotors of which the axes may be inclined to one another, said coupling comprising two rigid heads separated from one another by a predetermined distance and a body of elastic material in which the two rigid heads are at least partially embedded, each rigid head comprising a base and an end-plate joined to the said base by a neck such that the opposed faces of the base and of the end-plate define with the neck an annular groove of a profile and depth such that the bead of elastic material which is pinched therein cannot escape therefrom under the action of relative axial forces transmitted between the two bases, and the end-plate being recessed so as to have radial notches into which the elastic material extends.

In a preferred embodiment at least one of the following features or any combination of these features is furthermore employed:

a. the opposite faces of the base and of the disc-plate of each head may be substantially perpendicular to the axis of the shaft end joined to the said head;
b. the axial thickness of the bead seated in the annular groove may be less than its radial depth;
c. the notches may define, between one another, radial projections, which widen out towards their ends;
d. the number of such projections may preferably be four and the end-plate thus have the shape of a Maltese cross; and
e. the opposite surfaces of the disc-plates may be slightly conical or domed.

In order that the invention may be better understood, the following description of a preferred embodiment is given with reference to the accompanying drawing, in which:

FIG. 1 is an axial section of one form of the coupling device according to the invention; and FIG. 2 is an end elevation view of one of the element of the device of FIG. 1.

In FIG. 1, the two shafts 1 and 2 are provided with respective rigid heads 3 and 4, at least a part of these heads being embedded in a body 5 of elastic material.

In this Figure, each shaft end is shown as comprising a threaded axial tip 6 and each rigid head as being equipped with a tapped axial hole 7 into which the corresponding tip is screwed. However, it must be understood that this method of fixing is not essential to the invention and that it is possible, without departing from the spirit of the invention, to use any other suitable means of fixing, or even to form each head as an integral part of the associated shaft by being machined at the same time as the shaft.

The rigid head 4 will now be described with reference to both FIG. 1 and FIG. 2, it being understood that the head 3 is identical with the head 4. The head 4 comprises a base 8, advantageously circular, having its median transverse plane substantially perpendicular to the axis of shaft 2.

The head 4 also has a disc-plate 9 which is joined to the base 8 by a neck 10 and is also substantially perpendicular to the shaft 2, and hence parallel to the median plane of the base 8. Thus the disc-plate 9, the neck 10 and the base 8 define a groove 11, the sides of which are formed by the opposite faces 8a and 9a of the base 8 and of the disc-plate 9, respectively. These surfaces 8a and 9a are substantially parallel to one another and are each substantially perpendicular to the axis of the shaft 2.

Furthermore, the depth of the groove 11 is markedly greater than its width, that is to say greater than the axial distance separating the two surfaces 8a and 9a.

This thus ensures that the bead of elastic material present in the said groove 11 cannot escape therefrom under the action of axial stress applied thereto even if, due to large forces, the elastic material is greatly compressed in certain regions.

Referring to FIG. 2, it is seen that the disc-plate 9 has several, in this case four, notches 13 which define between them radial projections 14.

In a preferred embodiment, the projections 14 are widened towards their radially outer ends, that is to say the width of their ends is greater than the width of their bases. These widened portions, combined with a sufficient radial length of the corresponding projections, have the advantage that the portions or fingers 15 of elastic material clamped between the projections 14 cannot become detached under the action of centrifugal forces applied to them when the unit rotates.

In this preferred case, as shown, where there are four projections the disc-plate 9 is thus, in front elevation, in the form of a Maltese cross.

Furthermore, as can be seen in FIG. 1, the opposed faces of the disc-plates 9 are slightly conical or domed, to prevent the ends of the projections 14 of the heads 3 and 4 coming too close together when the shafts 1 and 2 are inclined relative to one another.

In general terms, the heads 3 and 4 are thus in the shape of a capstan of which the projections 14, the neck 10 and, at least partially, the base 8 are embedded in the body of elastic material 5.

The surfaces of the heads 3 and 4 which are in contact with the elastic material are preferably grained, for example in the raw cast condition, or are machined and then sand-blasted. The elastic material, which is preferably an elastomer, can be moulded around the heads and the surfaces of the latter can beforehand be coated with bonding agent. The elastic material can also be fixed to the surfaces by any other suitable process such as vulcanisation.

In order that the elastic material should adhere, perfectly to the heads and that no tears should be started, it is advantageous that the heads should not have any sharp angles.

The thickness of the elastic material located between the opposed slightly conical axial end faces of the two disc-plates 9 depends on the torque to be transmitted and on the diameter of each disc-plate 9, and also on the nature of the material used.

In the course of rotation, the torque is largely transmitted perpendicularly to the side faces of the projections 14; the fingers 15 of elastic material thus remain wedged between the projections 14 and, as a result of this imbrication, the anchoring of the heads 3 and 4 in the body 5 is excellent making it possible to transmit considerable torques from one of these shafts to the other, without the danger of detachment of the elastic body 5.

Furthermore, if the two shafts move apart slightly in the axial direction, or if their axes incline to one another, the tensile stress to which the elastic material is subjected locally remains applied perpendicularly to the faces of the groove 11; the bead 12 of elastic material remains in position in the groove 11, which ensures excellent axial anchoring, and furthermore prevents detachment of the elastic material.

Of course the illustrated embodiment has only been described purely by way of example and without implying any limitation, and many modifications are possible within the scope of the invention as defined by the following claims. For example the number of notches and of projections 14 is related to the magnitude of the torque to be transmitted and may be other than four.

I claim:

1. An elastic rotational drive coupling comprising: two rigid heads separated from one another by a predetermined distance and adapted to be fixed to two shaft ends to be coupled; and a body of elastic material in which the two rigid heads are at least partially embedded; each of said rigid heads having an axis of rotational symmetry and comprising: a base, means for fixing said base to a rotor, a plate spaced from said base, neck means connecting said plate to said base to define between said plate and base annular groove means, opposed, spaced faces of said plate and of said base being shaped to trap said elastic material of said body in said annular groove means, and means on said plate defining radially extending notches receiving said elastic material, said means on said plate defining radially extending notches comprising radial projections which widen out towards their radially outer ends.

2. A coupling as set forth in claim 1, wherein said opposed faces of the base and of the plate of each head are substantially perpendicular to said axis of rotational symmetry.

3. A coupling as set forth in claim 1, wherein the axial thickness of said annular groove means is less than its radial depth.

4. A coupling as set forth in claim 1, wherein there are four such projections and the plate has the shape of a Maltese cross.

5. A coupling as set forth in claim 1, wherein each head has an axially outer face on its plate which is slightly conical or domed.

6. A coupling as set forth in claim 1, wherein said base of each head is integrally formed with a rotor connected to the coupling.

7. An elastic rotational drive coupling consisting essentially of two rigid heads separated from one another by a predetermined distance and adapted to be fixed to two shaft ends to be coupled; and a body of elastic material in which the two rigid heads are at least partially embedded; each of said rigid heads having an axis of rotational symmetry and comprising: a base, means for fixing said base to a rotor, a plate spaced from said base, neck means connecting said plate to said base to define between said plate and base annular groove means, opposed, spaced faces of said plate and of said base being shaped to trap said elastic material of said body in said annular groove means, and means on said plate defining radially extending notches receiving said elastic material, said means on said plate defining radially extending notches comprising radial projections which widen out towards their radially outer ends.

8. A coupling according to claim 7 wherein there are four such projections and the plate has the shape of a Maltese cross.

* * * * *